(12) United States Patent
Yamamura

(10) Patent No.: US 10,807,620 B2
(45) Date of Patent: Oct. 20, 2020

(54) PROGRAM DEVELOPMENT SUPPORTING APPARATUS, TRAIN MONITORING AND CONTROLLING APPARATUS, AND PROGRAM DEVELOPMENT SUPPORTING METHOD

(71) Applicant: MITSUBISHI ELECTRIC CORPORATION, Chiyoda-ku, Tokyo (JP)

(72) Inventor: Tadashi Yamamura, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 80 days.

(21) Appl. No.: 16/097,641

(22) PCT Filed: May 13, 2016

(86) PCT No.: PCT/JP2016/064377
§ 371 (c)(1),
(2) Date: Oct. 30, 2018

(87) PCT Pub. No.: WO2017/195369
PCT Pub. Date: Nov. 16, 2017

(65) Prior Publication Data
US 2019/0135313 A1 May 9, 2019

(51) Int. Cl.
*G05D 1/00* (2006.01)
*B61L 15/00* (2006.01)
(Continued)

(52) U.S. Cl.
CPC .......... *B61L 15/0063* (2013.01); *B60L 15/42* (2013.01); *B61L 15/0036* (2013.01);
(Continued)

(58) Field of Classification Search
CPC ... B61L 15/0063; B61L 15/0036; B60L 15/42
See application file for complete search history.

(56) References Cited

U.S. PATENT DOCUMENTS

| | | | | |
|---|---|---|---|---|
| 2006/0244581 A1* | 11/2006 | Breed | ................. | B60C 23/0408 340/447 |
| 2008/0036185 A1* | 2/2008 | Breed | .................... | B60N 2/002 280/734 |
| 2010/0246659 A1* | 9/2010 | Mohamadi | .............. | G01S 7/032 375/239 |

FOREIGN PATENT DOCUMENTS

| | | |
|---|---|---|
| JP | H05233016 A | 9/1993 |
| JP | H1124702 A | 1/1999 |
| | (Continued) | |

OTHER PUBLICATIONS

International Search Report (PCT/ISA/210) dated Aug. 9, 2016, by the Japan Patent Office as the International Searching Authority for International Application No. PCT/JP2016/064377.
(Continued)

*Primary Examiner* — Adam M Alharbi
(74) *Attorney, Agent, or Firm* — Buchanan Ingersoll & Rooney PC

(57) ABSTRACT

An apparatus for supporting development of a program used in a control device of a train monitoring and controlling apparatus including a plurality of intra-train networks, the control device transmitting/receiving signals to/from the plurality of intra-train networks, the control device including a plurality of communication substrates for communicating with one of the plurality of intra-train networks and the control substrate connected to the plurality of communication substrates, the program development supporting apparatus receives a communication-substrate network communication data definition file used in each of the plurality of communication substrates, generates a control-substrate
(Continued)

input/output signal variable definition file by using the communication-substrate network communication data definition file, and outputs the control-substrate input/output signal variable definition file. The control-substrate input/output signal variable definition file is used in the control substrate, the control substrate performing communication in a communication data format that is common among the plurality of communication substrates.

5 Claims, 17 Drawing Sheets

(51) Int. Cl.
*G06F 9/44* (2018.01)
*G05B 15/02* (2006.01)
*B60L 15/42* (2006.01)
*G05B 19/05* (2006.01)
*G06F 8/70* (2018.01)

(52) U.S. Cl.
CPC .......... *B61L 15/0072* (2013.01); *G05B 15/02* (2013.01); *G05B 19/05* (2013.01); *G06F 8/70* (2013.01); *G06F 9/44* (2013.01); *Y02T 90/16* (2013.01)

(56) References Cited

FOREIGN PATENT DOCUMENTS

| | | |
|---|---|---|
| JP | 2003015705 A | 1/2003 |
| JP | 2008041022 A | 2/2008 |
| JP | 2009077069 A | 4/2009 |
| JP | 2013045189 A | 3/2013 |

OTHER PUBLICATIONS

Written Opinion (PCT/ISA/237) dated Aug. 9, 2016, by the Japan Patent Office as the International Searching Authority for International Application No. PCT/JP2016/064377.

* cited by examiner

| DATATYPE | ANOTHER NAME | DESCRIPTION |
|---|---|---|
| BOOLEAN | bool | ONE (TRUE OR FALSE)/BIT |
| INTEGER8 | char | EIGHT-BIT SIGNED INTEGER |
| UNSIGNED8 | uchar | INTEGER WITH NO EIGHT-BIT CODE |
| INTEGER16 | short | 16-BIT SIGNED INTEGER |
| UNSIGNED16 | ushort | INTEGER WITH NO 16-BIT CODE |
| INTEGER32 | int | 32-BIT SIGNED INTEGER |
| UNSIGNED32 | uint | INTEGER WITH NO 32-BIT CODE |
| REAL32 | float | 32-BIT SINGLE PRECISION FLOATING DECIMAL POINT |

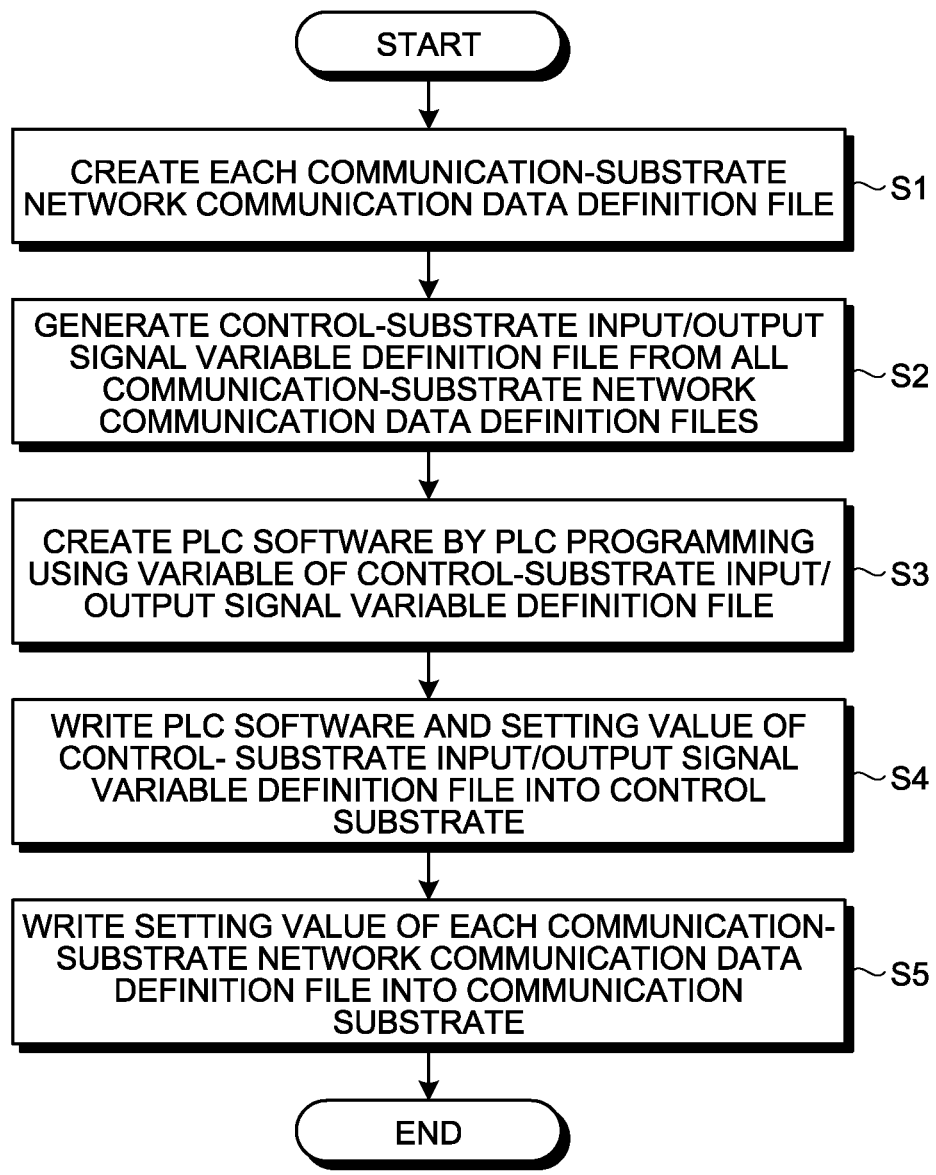

FIG. 8

[1610]
ParameterName=RPDO mapping parameter of RIO DI
ObjectType=0x9
SubNumber=4

[1610sub0]
ParameterName=Number of mapped application objects in PDO
ObjectType=0x7
DataType=0x0005
AccessType=rw
DefaultValue=3
PDOMapping=0
LowLimit=0x00
HighLimit=0x08
ParameterValue=0x3

[1610sub1]
ParameterName=mappedObj1
ObjectType=0x7
DataType=0x0007
AccessType=rw
DefaultValue=0x0
PDOMapping=0
ParameterValue=0x50000108

[1610sub2]
ParameterName=mappedObj2
ObjectType=0x7
DataType=0x0007
AccessType=rw
DefaultValue=0x0
PDOMapping=0
ParameterValue=0x50000208

[1610sub3]
ParameterName=mappedObj3
ObjectType=0x7
DataType=0x0007
AccessType=rw
DefaultValue=0x0
PDOMapping=0
ParameterValue=0x50000308

[1A11]
ParameterName=TPDO mapping parameter of RIO AO
ObjectType=0x9
SubNumber=3

[1A11sub0]
ParameterName=Number of mapped application objects in TPDO
ObjectType=0x7
DataType=0x0005
AccessType=rw
DefaultValue=2
PDOMapping=0
LowLimit=0
HighLimit=8
ParameterValue=0x2

[1A11sub1]
ParameterName=Application object 1
ObjectType=0x7
DataType=0x0007
AccessType=rw
DefaultValue=0x0
PDOMapping=0
ParameterValue=0x52800110

[1A11sub2]
ParameterName=Application object 2
ObjectType=0x7
DataType=0x0007
AccessType=rw
DefaultValue=0x0
PDOMapping=0
ParameterValue=0x52800210

[5000]
ParameterName=BOOLEAN for RPDO
ObjectType=0x8
SubNumber=129

[5000sub0]
ParameterName=NrOfEntries
ObjectType=0x7
DataType=0x0005
AccessType=ro
DefaultValue=128
PDOMapping=0
LowLimit=0x00
HighLimit=0xfe
ParameterValue=0x80

[5000sub1]
ParameterName=CAN_RIO_DIch[7..0]
ObjectType=0x7
DataType=0x0005
AccessType=rww
DefaultValue=0x00
PDOMapping=1
ParameterValue=0x00

[5000sub2]
ParameterName=CAN_RIO_DIch[15..8]
ObjectType=0x7
DataType=0x0005
AccessType=rww
DefaultValue=0x00
PDOMapping=1
ParameterValue=0x00

[5000sub3]
ParameterName=CAN_RIO_DIch[23..16]
ObjectType=0x7
DataType=0x0005
AccessType=rww
DefaultValue=0x00
PDOMapping=1
ParameterValue=0x00

[5280]
ParameterName=UNSIGNED16 for TPDO
ObjectType=0x8
SubNumber=65

[5280sub0]
ParameterName=NrOfEntries
ObjectType=0x7
DataType=0x0005
AccessType=ro
DefaultValue=64
PDOMapping=0
LowLimit=0x00
HighLimit=0xfe
ParameterValue=0x40

[5280sub1]
ParameterName=RIO_AOch0
ObjectType=0x7
DataType=0x0006
AccessType=rwr
DefaultValue=0x0
PDOMapping=1
ParameterValue=0x800
Denotation=0 V

[5280sub2]
ParameterName=RIO_AOch1
ObjectType=0x7
DataType=0x0006
AccessType=rwr
DefaultValue=0x0
PDOMapping=1
ParameterValue=0x800
Denotation=0 V

FIG.9

```
[2002]
ParameterName=Vehicle status coupling
ObjectType=0x9
SubNumber=5

[2002sub0]
ParameterName=NrOfObjects
ObjectType=0x7
DataType=0x0005
AccessType=ro
DefaultValue=4
PDOMapping=0
ParameterValue=4

[2002sub1]
ParameterName=Mapping parameter
of coupling status variable
ObjectType=0x7
DataType=0x0007
AccessType=rw
DefaultValue=0x52408008
PDOMapping=0
LowLimit=0x52400108
HighLimit=0x52408008
ParameterValue=0x52408008

[2002sub2]
ParameterName=Status mask value of
coupling change started
ObjectType=0x7
DataType=0x0005
AccessType=rw
DefaultValue=0x04
PDOMapping=0
LowLimit=0x00
HighLimit=0xFF
ParameterValue=0x04

[2002sub3]
ParameterName=Status mask value of
coupling change finished
ObjectType=0x7
DataType=0x0005
AccessType=rw
DefaultValue=0x18
PDOMapping=0
LowLimit=0x00
HighLimit=0xFF
ParameterValue=0x18

[5240sub80]
ParameterName=Local_VehStatus
ObjectType=0x7
DataType=0x0005
AccessType=rwr
DefaultValue=0x0
PDOMapping=1
ParameterValue=0x0
```

FIG.10

```
Frames
Name;Port;Type;Length
Current speed;124;Source;64
Main Temperature;264;Source;128

Signals
Name;Type;Offset;Frame;Endianness
Speed;Unsigned32;0;124;BIG
Door open;Boolean;32;124;LITTLE
Temperature;Unsigned32;0;264;LITTLE
Fill level;Unsigned16;32;264;BIG
```

FIG.11

```
#VARIABLE NAME, DATATYPE, INITIAL VALUE,
BYTE POSITION, BIT POSITION, BIT LENGTH

#FOR INPUT SIGNAL FROM SUB SYSTEM 1
ETH_S1_InSig1,Boolean,0,0,0,1
ETH_S1_InSig2,Boolean,0,0,1,1

⌇

#FOR OUTPUT SIGNAL TO SUB SYSTEM 1
ETH_S1_OutSig1,Boolean,0,0,0,1
ETH_S1_OutSig2,Boolean,0,0,1,1

⌇

⋮

#FOR INPUT SIGNAL FROM SUB SYSTEM N
ETH_SN_InSig1,Boolean,0,0,0,1
ETH_SN_InSig2,Boolean,0,0,1,1

#FOR OUTPUT SIGNAL TO SUB SYSTEM N
ETH_SN_OutSig1,Boolean,0,0,0,1
ETH_SN_OutSig2,Boolean,0,0,1,1
        ⌇
```

FIG.15

| OD INDEX | DATA DIRECTION | DATATYPE |
|---|---|---|
| 0x5000 LEVEL | in | BOOLEAN8 |
| 0x5020 LEVEL | in | INTEGER8 |
| 0x5040 LEVEL | in | UNSIGNED8 |
| 0x5060 LEVEL | in | INTEGER16 |
| 0x5080 LEVEL | in | UNSIGNED16 |
| 0x50A0 LEVEL | in | INTEGER32 |
| 0x50C0 LEVEL | in | UNSIGNED32 |
| 0x50E0 LEVEL | in | REAL32 |

FIG.16

| OD INDEX | DATA DIRECTION | DATATYPE |
|---|---|---|
| 0x5200 LEVEL | out | BOOLEAN8 |
| 0x5220 LEVEL | out | INTEGER8 |
| 0x5240 LEVEL | out | UNSIGNED8 |
| 0x5260 LEVEL | out | INTEGER16 |
| 0x5280 LEVEL | out | UNSIGNED16 |
| 0x52A0 LEVEL | out | INTEGER32 |
| 0x52C0 LEVEL | out | UNSIGNED32 |
| 0x52E0 LEVEL | out | REAL32 |

FIG.17

```
#DATATYPE, DATA DIRECTION,
SEQUENCE NUMBER, VARIABLE NAME
Boolean,in,0,CAN_RIO_DIch0
Boolean,in,1,CAN_RIO_DIch1
              ⌇
Unsigned16,in,0,CAN_RIO_AIch0
Unsigned16,in,1,CAN_RIO_AIch1
              ⌇
Boolean,out,0,CAN_RIO_DOch0
Boolean,out,1,CAN_RIO_DOch1
              ⌇
Unsigned16,out,0,CAN_RIO_AOch0
Unsigned16,out,1,CAN_RIO_AOch1
              ⌇
```

PROGRAM DEVELOPMENT SUPPORTING APPARATUS, TRAIN MONITORING AND CONTROLLING APPARATUS, AND PROGRAM DEVELOPMENT SUPPORTING METHOD

FIELD

The present invention relates to a program development supporting apparatus for supporting development of a program used in a control device of the train monitoring and controlling apparatus, to the train monitoring and controlling apparatus, and to a program development supporting method.

BACKGROUND

Some well-known train monitoring and controlling apparatus (referred to as Train Control and Monitoring System (TCMS) below), which is mounted in a train and monitors and controls an intra-train state, includes a plurality of intra-train networks. Sub systems such as a Remote Input/Output (RIO) device, a door controlling device, and an air conditioning controlling device are connected to each intra-train network. The reasons why the TCMS has the plurality of intra-train networks are that: a communication load on the intra-train network needs to be lowered; different communication physical standards are provided for the different sub systems; the number of devices that can be connected to the single intra-train network is limited; and the devices need to be grouped together by function such as door controlling devices.

A type of a physical layer of the intra-train network of the TCMS includes a Controller Area Network (CAN), a Multifunction Vehicle Bus (MVB), the Ethernet (ETH) (registered trademark), and the like. In the TCMS, all the plurality of intra-train networks may be configured by the CANs, and all the plurality of intra-train networks may be different types of physical layers.

A Vehicle Control Unit (VCU), which is a control device of the TCMS, implements logical control with a device providing various functions of the TCMS and receives a signal input from each sub system and outputs the signal to each sub system. For logical control of the VCU, a Programmable Logic Controller (PLC) that is not hard coded is often used. The VCU and each sub system are often manufactured by different manufacturers. In addition, the VCU is connected to a plurality of intra-train networks. In a case where the VCU is connected to the plurality of intra-train networks, a program for the VCU corresponding to communication with each intra-train network is required.

Patent Literature 1 discloses a technique enabling a programmer to perform programming without considering an address in communication programming between a plurality of controller devices integrated through a network. Specifically, in a program of each controller written by a programming device, a work memory in the controller is automatically assigned to a communication input/output symbol having a data variable name allocated, and an equivalence setting management table for equalizing the communication input/output symbols having the same data variable name allocated is created and stored in each controller. Equalize processing is performed between the controller devices based on the equivalence setting management table.

Some VCU includes a control unit providing a logical control function and a communication unit providing a function of communicating with the intra-train network, the control unit being integrated with the communication unit. A problem with such a VCU having the control unit and communication unit that are integrated together is that the communication unit cannot be optionally selected. To solve such a problem, some VCU has the control unit and the communication unit, which are different substrates such that the required substrate can be inserted into a casing.

CITATION LIST

Patent Literature

Patent Literature 1: Japanese Patent Application Laid-Open No. 2003-15705

SUMMARY

Technical Problem

For the VCU having the control unit and the communication unit, which are the different substrates, data communication between the control unit and the communication unit in the VCU is required, with the result that a software configuration is more complicated than the VCU having the control unit and the communication unit, which are integrated together. A method for simplifying the software configuration of the VCU having the control unit and the communication unit, which are the different substrates, includes hard-cording of an operating environment such as a kind of an inserted substrate, the number of substrates, and an input/output signal in the VCU in the data communication between the control unit and each communication unit. Unfortunately, the kind of and the number of input/output signals vary according to a system corresponding to each communication unit, which poses a problem of requiring manufacturing of software for each system and thus increasing the man-hours.

The present invention has been made in view of the above. An object of the present invention is to obtain a program development supporting apparatus capable of reducing man-hours in developing a program used in a control device of a train monitoring and controlling apparatus, the control device including a control unit and a communication unit, which are different substrates.

Solution to Problem

To solve the above problems and to achieve the object, the present invention provides a program development supporting apparatus for supporting development of a program used in a control device of a train monitoring and controlling apparatus including a plurality of intra-train networks and the control device, the control device transmitting/receiving signals to/from the plurality of intra-train networks. The control device includes a plurality of communication substrates for communicating with one of the plurality of intra-train networks, and a control substrate connected to the plurality of communication substrates. The program development supporting apparatus includes an input unit to receive a communication-substrate network communication data definition file used in each of the plurality of communication substrates. The program development supporting apparatus also includes a generation unit to generate a control-substrate input/output signal variable definition file by using the communication-substrate network communication data definition file, the control-substrate input/output signal variable definition file being used in the control substrate, the control substrate performing communication in a common communication data format that is a communication format in common among the plurality of communication substrates. The program development supporting apparatus also includes an output unit to output the control-substrate input/output signal variable definition file.

Advantageous Effects of Invention

The present invention can reduce the man-hours in developing the program used in the control device of the train monitoring and controlling apparatus, the control device including the control unit and the communication unit, which are the different substrates.

BRIEF DESCRIPTION OF DRAWINGS

FIG. 7 is a flowchart illustrating a procedure of processing for a user to develop a program used in the VCU by using the program development supporting apparatus.

FIG. 8 is a diagram illustrating an example of a network communication data definition file for a CAN communication substrate, which file is created by the user and used for developing a program of the VCU.

FIG. 9 is a diagram illustrating another example of the network communication data definition file for a CAN communication substrate, which file is created by the user and used for developing the program of the VCU.

FIG. 10 is a diagram illustrating an example of a network communication data definition file for an MVB communication substrate, which file is created by the user and used for developing a program of the VCU.

FIG. 11 is a diagram illustrating an example of a network communication data definition file for an ETH communication substrate, which file is created by the user and used for developing a program of the VCU.

FIG. 15 is a diagram illustrating an example of information regarding an OD index, a data direction, and a datatype, the information being held by a storage unit of the program development supporting apparatus.

FIG. 16 is a diagram illustrating another example of the information regarding the OD index, the data direction, and the datatype, the information being held by the storage unit of the program development supporting apparatus.

FIG. 17 is a diagram illustrating an exemplary configuration of an inter-substrate communication input/output signal variable definition file generated by the generation unit of the program development supporting apparatus.

DESCRIPTION OF EMBODIMENTS

Hereinafter, a program development supporting apparatus, a train monitoring and controlling apparatus, and a program development supporting method according to an embodiment of the present invention will be described in detail with reference to the drawings. The present invention is not limited to the embodiment.

EMBODIMENT

Figure 1:
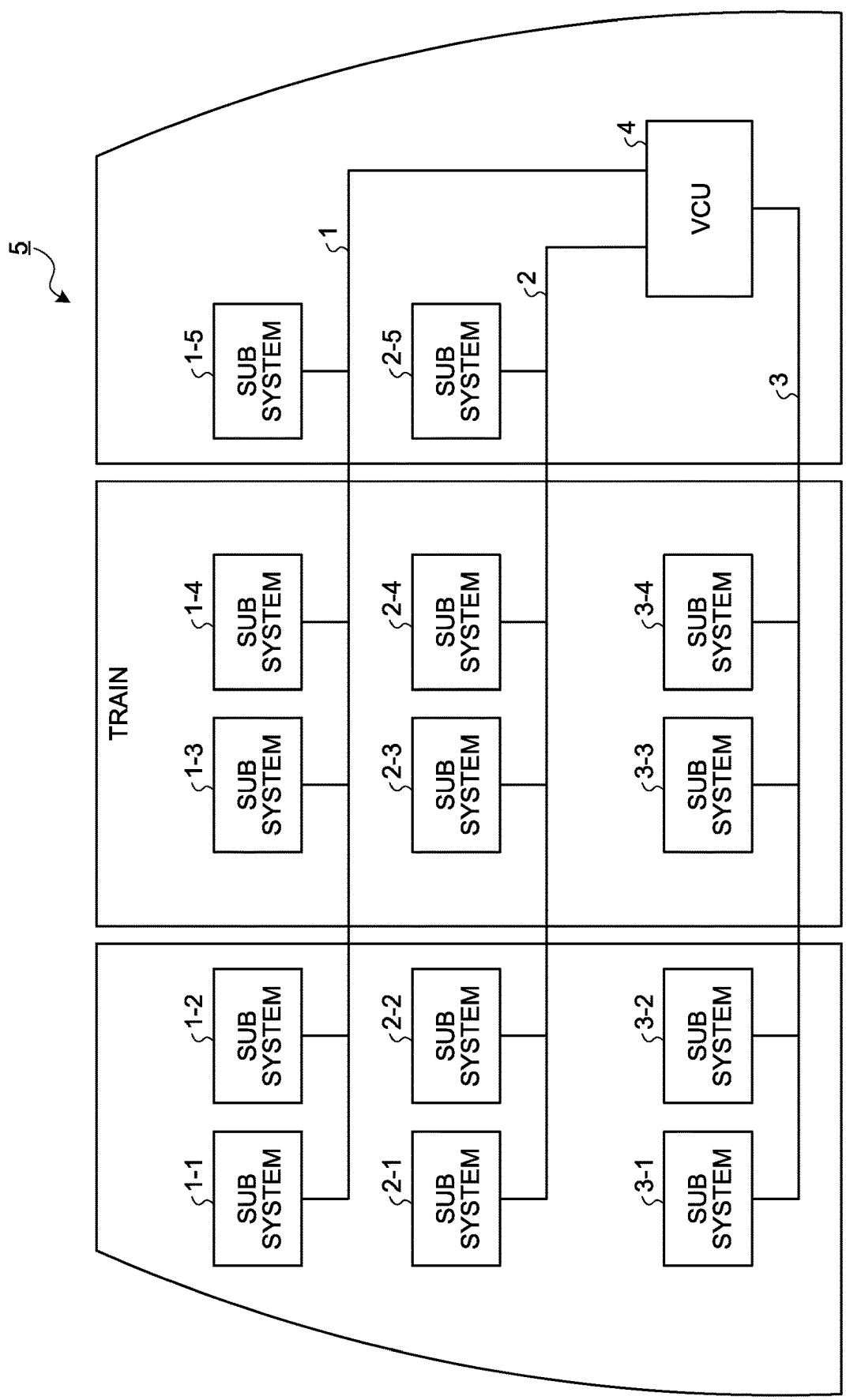
FIG. 1 is a diagram illustrating an exemplary configuration of a TCMS.

FIG. 1 is a diagram illustrating an exemplary configuration of a TCMS 5 according to an embodiment of the present invention. The TCMS 5, which is a train monitoring and controlling apparatus, includes intra-train networks 1, 2, and 3 and a VCU 4. The intra-train networks are mounted in a train. The VCU 4 is a control device connected to the intra-train networks 1 to 3. Sub systems 1-1, 1-2, 1-3, 1-4, and 1-5 are connected to the intra-train network 1. Sub systems 2-1, 2-2, 2-3, 2-4, and 2-5 are connected to the intra-train network 2. Sub systems 3-1, 3-2, 3-3, and 3-4 are connected to the intra-train network 3. The intra-train networks 1 to 3 may be the same kinds, but, by way of example, the intra-train network 1 is a network provided by the CAN; the intra-train network 2 is a network provided by the MVB; and the intra-train network 3 is a network provided by the ETH. The sub systems connected to the intra-train networks 1 to 3 are, for example, a RIO device, a door controlling device, and an air conditioning controlling device. Although the intra-train networks in the TCMS 5 in the embodiment are three in number, the number of intra-train networks may be equal to or less than two or equal to or more than four.

Figure 2:
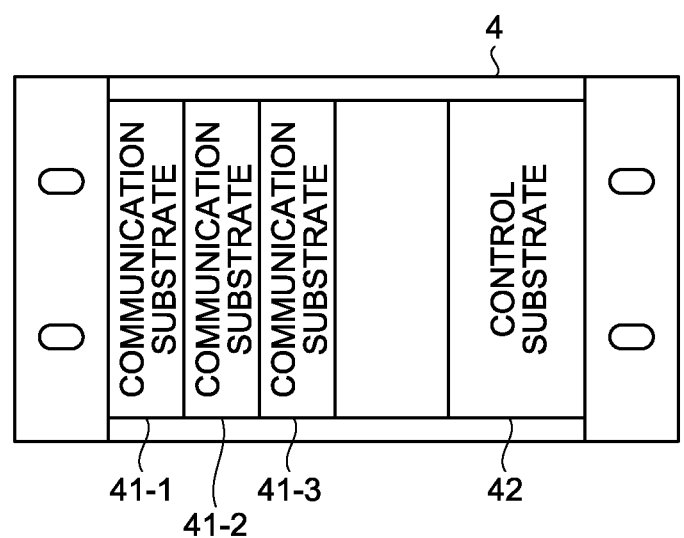
FIG. 2 is a diagram illustrating an exemplary configuration of a VCU.

In the VCU 4, a substrate of a communication unit connected to each of the intra-train networks 1 to 3 is separate from a substrate of a control unit. FIG. 2 is a diagram illustrating an exemplary configuration of the VCU 4 according to the present embodiment. The VCU 4 includes communication substrates 41-1, 41-2, and 41-3 each having a function of the communication unit, and a control substrate 42 having a function of the control unit. The communication substrate 41-1 is connected to the intra-train network 1 for communication through the CAN. The communication substrate 41-2 is connected to the intra-train network 2 for communication through the MVB. The communication substrate 41-3 is connected to the intra-train network 3 for communication through the ETH. The control substrate 42 is connected to the communication substrates 41-1 to 41-3. When the communication substrates 41-1 to 41-3 are discussed without being distinguished from each other, each of the communication substrates may be hereinafter referred to as a communication substrate 41.

Figure 3:
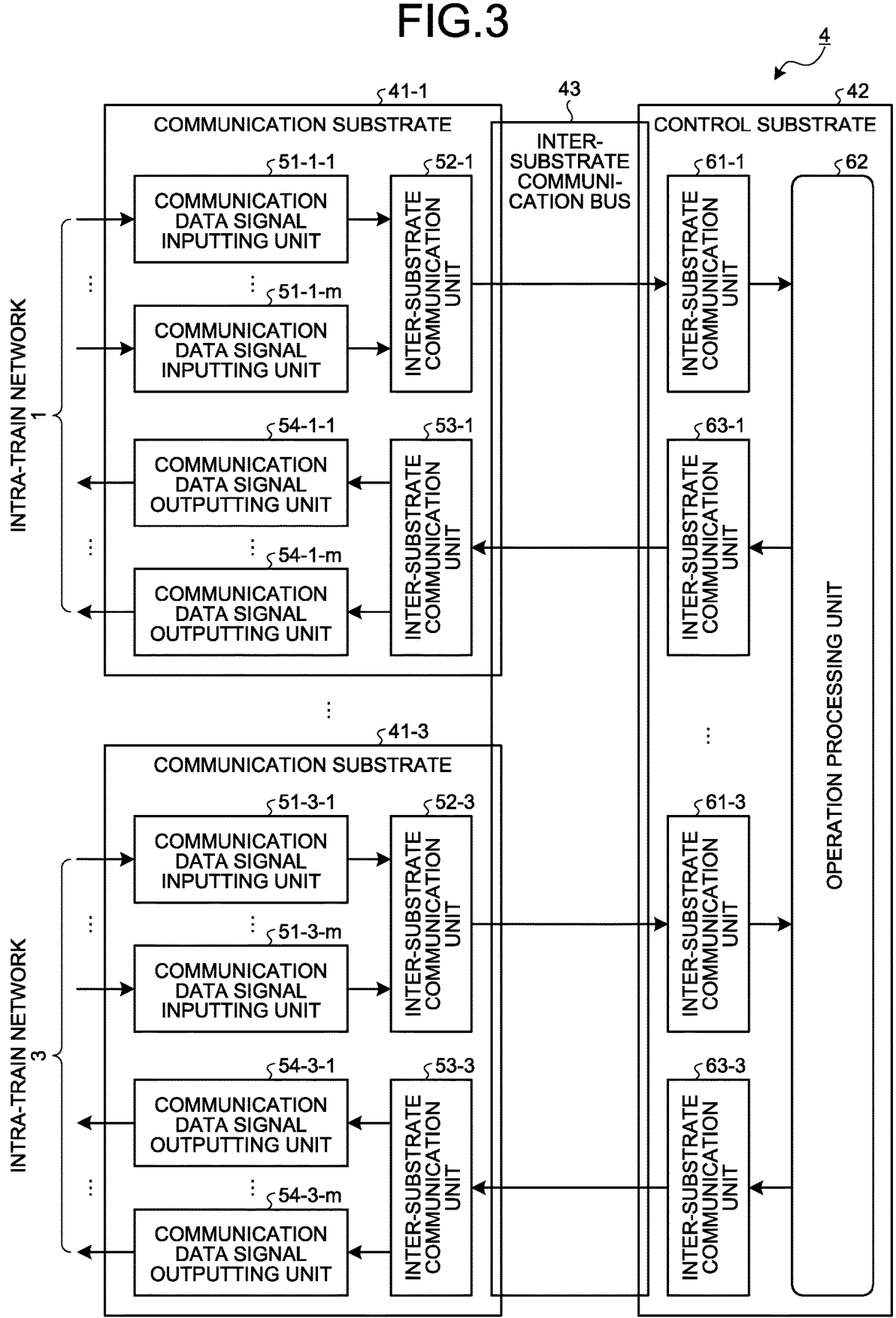
FIG. 3 is a block diagram illustrating an exemplary configuration of the VCU.

FIG. 3 is a block diagram illustrating an exemplary configuration of the VCU 4 according to the present embodiment. The communication substrate 41-1 of the VCU 4 includes communication data signal inputting units 51-1-1 to 51-1-$m$, inter-substrate communication units 52-1 and 53-1, and communication data signal outputting units 54-1-1 to 54-1-$m$. The communication data signal inputting units 51-1-1 to 51-1-$m$ receive signals from the sub systems 1-1 to 1-5 of the intra-train network 1. The inter-substrate communication unit 52-1 converts CAN signals transmitted from the communication data signal inputting units 51-1-1 to 51-1-$m$ into signals in a common communication data format that is a communication data format in common among the communication substrates 41-1 to 41-3. The inter-substrate communication unit 52-1 transmits the signals in the common communication data format to the control substrate 42 via an inter-substrate communication bus 43. The inter-substrate communication unit 53-1 converts the signals in the common communication data format received from the control substrate 42 into signals for the intra-train network 1, that is, the CAN signals and outputs the converted signals. The communication data signal outputting units 54-1-1 to 54-1-$m$ transmit the CAN signals transmitted from the inter-substrate communication unit 53-1 to the intra-train network 1.

In the VCU 4, the communication substrate 41-2, which is not illustrated in FIG. 3, includes communication data signal inputting units 51-2-1 to 51-2-$m$, inter-substrate communication units 52-2 and 53-2, and communication data signal outputting units 54-2-1 to 54-2-$m$. The communication data signal inputting units 51-2-1 to 51-2-$m$ receive signals from the sub systems 2-1 to 2-5 of the intra-train network 2. The inter-substrate communication unit 52-2 converts MVB signals transmitted from the communication data signal inputting units 51-2-1 to 51-2-$m$ into signals in the common communication data format, and transmits the converted signals to the control substrate 42 via the inter-substrate communication bus 43. The inter-substrate communication unit 53-2 converts the signals in the common communication data format received from the control substrate 42 into signals for the intra-train network 2, that is, the MVB signals and outputs the converted signals. The communication data signal outputting units 54-2-1 to 54-2-$m$ transmit the MVB signals transmitted from the inter-substrate communication unit 53-2 to the intra-train network 2.

In the VCU 4, the communication substrate 41-3 includes communication data signal inputting units 51-3-1 to 51-3-$m$, inter-substrate communication units 52-3 and 53-3, and communication data signal outputting units 54-3-1 to 54-3-$m$. The communication data signal inputting units 51-3-1 to 51-3-$m$ receive signals from the sub systems 3-1 to 3-4 of the intra-train network 3. The inter-substrate communication unit 52-3 converts the ETH signals transmitted from the communication data signal inputting units 51-3-1 to 51-3-$m$ into signals in the common communication data format that is a communication data format in common among the intra-train networks 1 to 3. The inter-substrate communication unit 52-3 transmits the converted signals to the control substrate 42 via the inter-substrate communication bus 43. The inter-substrate communication unit 53-3 converts the signals in the common communication data format received from the control substrate 42 into signals for the intra-train network 3, that is, the ETH signals and outputs the converted signals. The communication data signal outputting units 54-3-1 to 54-3-$m$ transmit the ETH signals transmitted from the inter-substrate communication unit 53-3 to the intra-train network 3.

As described above, each communication substrate 41 transmits/receives network communication data corresponding to a physical layer of the corresponding intra-train network to/from the corresponding sub system in such a manner that the transmission of the data and the reception of the data are made separately. When the communication data signal inputting units 51-1-1 to 51-1-$m$, 51-2-1 to 51-2-$m$, and 51-3-1 to 51-3-$m$ are discussed without being distinguished from each other, each of the communication data signal inputting units may be hereinafter referred to as a communication data signal inputting unit 51. Furthermore, when the inter-substrate communication units 52-1 to 52-3 are discussed without being distinguished from each other, each of the inter-substrate communication units may be referred to as an inter-substrate communication unit 52. In addition, when the inter-substrate communication units 53-1 to 53-3 are discussed without being distinguished from each other, each of the inter-substrate communication units may be referred to as an inter-substrate communication unit 53. In addition, when the communication data signal outputting units 54-1-1 to 54-1-$m$, 54-2-1 to 54-2-$m$, and 54-3-1 to 54-3-$m$ are discussed without being distinguished from each other, each of the communication data signal outputting units may be referred to as a communication data signal outputting unit 54. The inter-substrate communication units 52 and 53 of each communication substrate 41 are collectively referred to as a second inter-substrate communication unit.

The control substrate 42 of the VCU 4 includes inter-substrate communication units 61-1 to 61-3, an operation processing unit 62, and inter-substrate communication units 63-1 to 63-3. The inter-substrate communication units 61-1 to 61-3 convert signals in the common communication data format received from the communication substrates 41-1 to 41-3 into signals for the intra-train networks 1 to 3. That is, the inter-substrate communication units 61-1 to 61-3 bring the signals in the common communication data format back into the original format. The inter-substrate communication units 61-1 to 61-3 then output the signals in the original format. The operation processing unit 62 performs various control on the signals received from the inter-substrate communication units 61-1 to 61-3. The operation processing unit 62 is, for example, a PLC. The inter-substrate communication units 63-1 to 63-3 convert the signals input from the operation processing unit 62 into signals in the common communication data format, and transmit the converted signals to the communication substrates 41-1 to 41-3 via the inter-substrate communication bus 43.

When the inter-substrate communication units 61-1 to 61-3 are discussed without being distinguished from each other, the inter-substrate communication units may be hereinafter referred to as an inter-substrate communication unit 61. In addition, when the inter-substrate communication units 63-1 to 63-3 are discussed without being distinguished from each other, the inter-substrate communication unit may be collectively referred to as an inter-substrate communication unit 63. The inter-substrate communication units 61 and 63 of the control substrate 42 are collectively referred to as a first inter-substrate communication unit.

Figure 4:
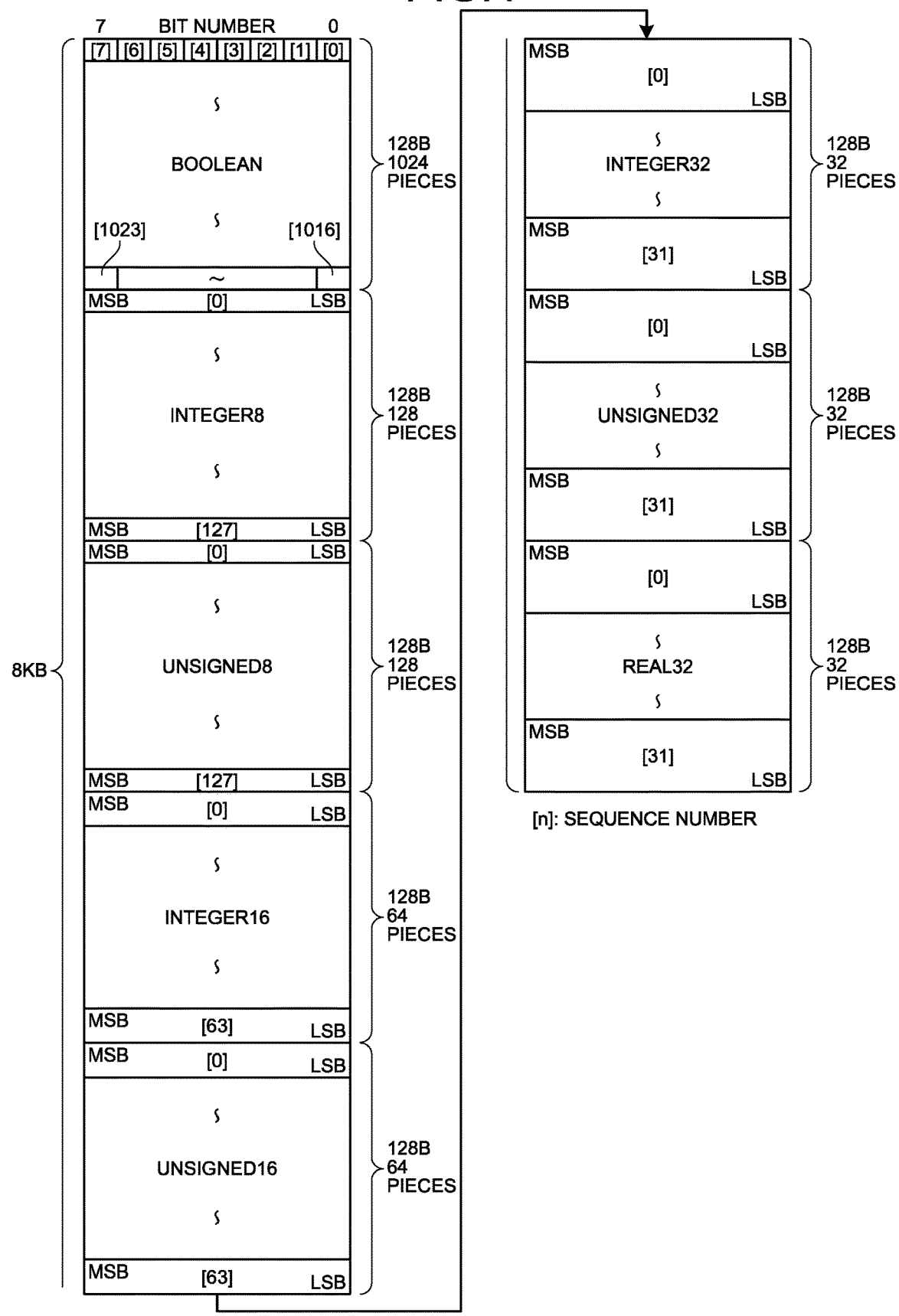
FIG. 4 is a diagram illustrating an example of a common communication data format used for communication between substrates of the VCU.

The control substrate 42 and the communication substrates 41-1 to 41-3 of the VCU 4 transmit/receive inter-substrate communication data to/from each other via the inter-substrate communication bus 43. The inter-substrate communication data communicated between the control substrate 42 and the communication substrates 41-1 to 41-3 is defined as data in the common communication data format that is a communication data format in common among the communication substrates 41-1 to 41-3 and the control substrate 42. The common communication data format will be described in detail. FIG. 4 is a diagram illustrating an example of the common communication data format used for communication between substrates of the VCU 4 according to the present embodiment. The common communication data format used in the communication substrates 41-1 to 41-3 and the control substrate 42 of the VCU 4 is a data format defines datatypes, which are "BOOLEAN", "INTEGER8", "UNSIGNED8", "INTEGER16", "UNSIGNED16", "INTEGER32", "UNSIGNED32", and "REAL32". The illustrated data format has its entire size of, for example, eight KB. Although variables to be arranged in each datatype have 128 bytes (B), the number of variables that can be arranged varies depending on the datatype. For example, the number of signals that can be arranged in "BOOLEAN" is 1024, and the number of signals that can be arranged in "REAL32" is 32. The number of variables that can be arranged in each datatype is merely an example, and the number is not limited to that in the example in FIG. 4.

Figures 5, 6:
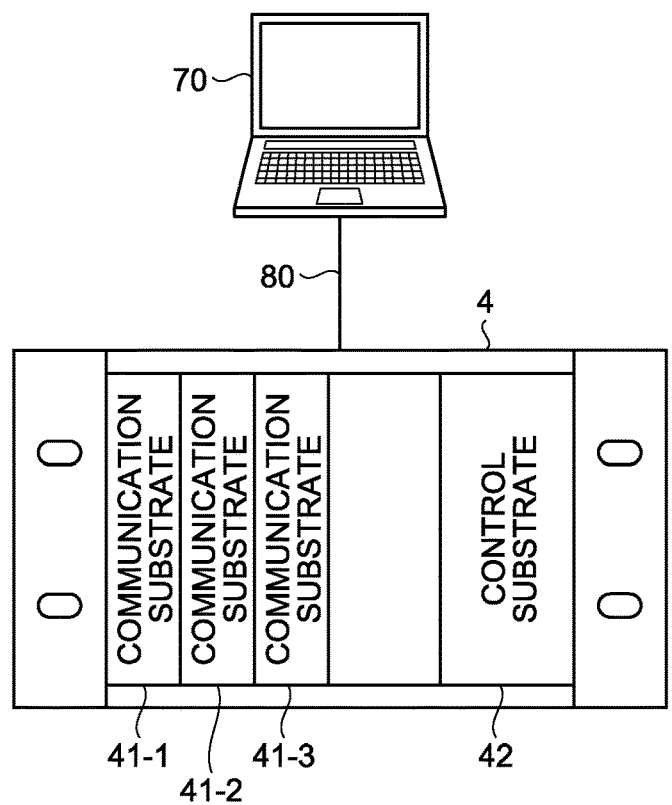
FIG. 5 is a diagram illustrating details of a datatype used for the common communication data format of the VCU.
FIG. 6 is a diagram illustrating connection relationship between the VCU and a program development supporting apparatus.

FIG. 5 is a diagram illustrating details of the datatype used for the common communication data format of the VCU 4 according to the present embodiment. For example, the variable of which the datatype is named "INTEGER 8" has another name "char" and indicates that the variable is an eight-bit signed integer.

Next, a description is made as to processing for a user to develop the program used in the VCU 4 having the communication substrates 41-1 to 41-3 and the control substrate 42 separate from the communication substrates 41-1 to 41-3. FIG. 6 is a diagram illustrating connection relationship between the VCU 4 and a program development supporting apparatus 70 according to the present embodiment. FIG. 7 is a flowchart illustrating a procedure of processing for the user to develop the program used in the VCU 4 by using the program development supporting apparatus 70 according to the present embodiment. The program development supporting apparatus 70 is a terminal device which the user uses in developing the program used in the VCU 4. The program development supporting apparatus 70 is, for example, a personal computer. The user uses the program development supporting apparatus 70 to thereby generate the program that is to be used in the VCU 4, such that the user writes into the VCU 4 via a communication cable 80 software including the program and various setting values.

First, the user creates each communication-substrate network communication data definition file (step S1). The communication-substrate network communication data definition file defines communication data in text or binary for communication with each sub system connected to the corresponding intra-train network. To create the communication-substrate network communication data definition file, the user uses a text editor or a dedicated tool in the program development supporting apparatus 70. For example, the network communication data definition file for CANopen used in the CAN includes a Device Configuration File (DCF) specified by a CAN in Automation (CiA) 306, and the user can create the file by using a dedicated editor provided from each vendor. For an MVB network communication data definition file, the user can use PIXY Application Designer (PAD) V3.2 and the like.

FIGS. 8 and 9 are diagrams illustrating examples of a network communication data definition file for a CAN communication substrate, which file is created by the user and used for developing the program of the VCU 4 according to the present embodiment. FIGS. 8 and 9 illustrate text files. FIG. 10 is a diagram illustrating an example of the network communication data definition file for an MVB communication substrate, which file is created by the user and used for developing the program of the VCU 4 according to the present embodiment. FIG. 11 is a diagram illustrating an example of a network communication data definition file for an ETH communication substrate, which file is created by the user and used for developing the program of the VCU 4 according to the present embodiment. In FIG. 11, a line having the character "#" at a head thereof is a comment line. FIGS. 10 and 11 illustrate Comma Separated Value (CSV) files.

Next, the program development supporting apparatus 70 receives inputs of all the network communication data definition files for the respective communication substrates, the files being created by the user in step S1, and generates a control-substrate input/output signal variable definition file from all the input network communication data definition files (step S2). The control-substrate input/output signal variable definition file defines a list of variables of all of named input/output signals of the VCU 4. The control-substrate input/output signal variable definition file is used in the VCU 4, and also defines association with the inter-substrate communication data between the control substrate 42 and the communication substrates 41-1 to 41-3 of the VCU 4.

The program development supporting apparatus 70 analyzes each communication-substrate network communication data definition file, thereby generating an inter-substrate communication input/output signal variable definition file for each network (i.e. each communication substrate). The inter-substrate communication input/output signal variable definition file associates the communication data (see FIG. 4) between each communication substrate and the control substrate with the input/output signals to/from each sub system. The program development supporting apparatus 70 classifies the variables on a datatype-by-datatype basis and allocates sequence numbers in the inter-substrate communication data in such a manner that none of the allocated sequence numbers is duplicated. To the inter-substrate communication input/output signal variable definition file, all the variables used in each intra-train network are registered. The program development supporting apparatus 70 extracts the variable one by one from each inter-substrate communication input/output signal variable definition file, classifies the variables on a datatype-by-datatype basis, reallocates the sequence numbers from zero, and, then, generates and outputs the control-substrate input/output signal variable definition file. The inter-substrate communication input/output signal variable definition file is associated with the control-substrate input/output signal variable definition file by the variable name, such that each input/output signal to/from the intra-train network is uniquely associated with the variable in the software used by the operation processing unit 62 of the control substrate 42. An operation of the program development supporting apparatus 70 in step S2 will be described later in detail.

Next, the user loads the control-substrate input/output signal variable definition file into a PLC programming tool by the program development supporting apparatus 70. The user performs PLC programming by using variables of the loaded control-substrate input/output signal variable definition file and creates PLC software used by the operation processing unit 62 of the control substrate 42 of the VCU 4 (step S3). The user writes into the control substrate 42 of the VCU 4 the created PLC software and a setting value of the control-substrate input/output signal variable definition file generated by the program development supporting apparatus 70 (step S4). Then, the user writes the setting value of each created communication-substrate network communication data definition file for into a target communication substrate 41 corresponding to a communication type (step S5).

After the control-substrate input/output signal variable definition file etc. has been written, a power supply of the VCU 4 of the TCMS 5 is turned on again to allow the VCU 4 to perform an operation required by the TCMS 5. Furthermore, since the program development supporting apparatus 70 automatically generates the control-substrate input/output signal variable definition file in the processing in step S2, it is possible to reduce a processing load on the user, that is, reduce the number of man-hours taken for the user to develop the software including the program used in the VCU 4.

On the basis of the PLC software and the setting value of the control-substrate input/output signal variable definition file written in the control substrate 42, as described above, the inter-substrate communication unit 61 of the control substrate 42 of the VCU 4 converts the signal in the common communication data format received from the communication substrate 41, into the signal for each of the intra-train networks 1 to 3, and the inter-substrate communication unit 63 of the control substrate 42 of the VCU 4 converts the signal transmitted from the operation processing unit 62 into a signal in the common communication data format. In addition, on the basis of the setting value of each communication-substrate network communication data definition file written in the communication substrate 41, as described above, the inter-substrate communication unit 52 of the communication substrate 41 of the VCU 4 converts the signal received from each intra-train network, into a signal in the common communication data format, and the inter-substrate communication unit 53 of the communication substrate 41 of the VCU 4 converts the signal in the common communication data format received from the control substrate 42, into a signal for each intra-train network.

Figure 12:
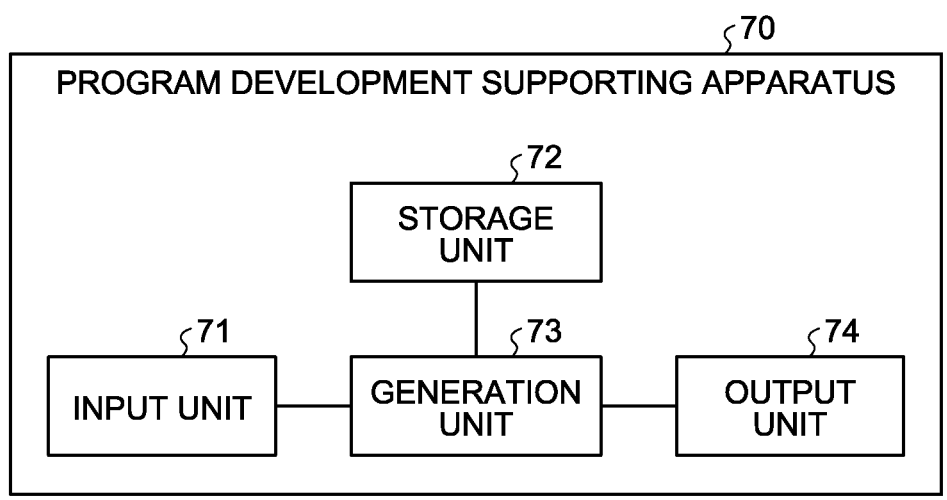
FIG. 12 is a block diagram illustrating an exemplary configuration of the program development supporting apparatus.

Next, processing in step S2 for generating control-substrate the input/output signal variable definition file by the program development supporting apparatus 70 in the processing for developing the program used in the VCU 4 will be described in detail. FIG. 12 is a block diagram illustrating an exemplary configuration of the program development supporting apparatus 70 according to the present embodiment. The program development supporting apparatus 70 includes an input unit 71, a storage unit 72, a generation unit 73, and an output unit 74.

The input unit 71 receives each communication-substrate network communication data definition file for the corresponding one of the communication substrates 41-1 to 41-3, the files being generated by the user. The storage unit 72 stores information needed when the generation unit 73 generates the inter-substrate communication input/output signal variable definition file from each communication-substrate network communication data definition file. Using the communication-substrate network communication data definition file used in each communication substrate, the generation unit 73 generates the control-substrate input/output signal variable definition file used in the control substrate 42 of the VCU 4 that communicates with the communication substrates 41-1 to 41-3 in the common communication data format. The output unit 74 outputs the control-substrate input/output signal variable definition file generated by the generation unit 73.

Figure 13:
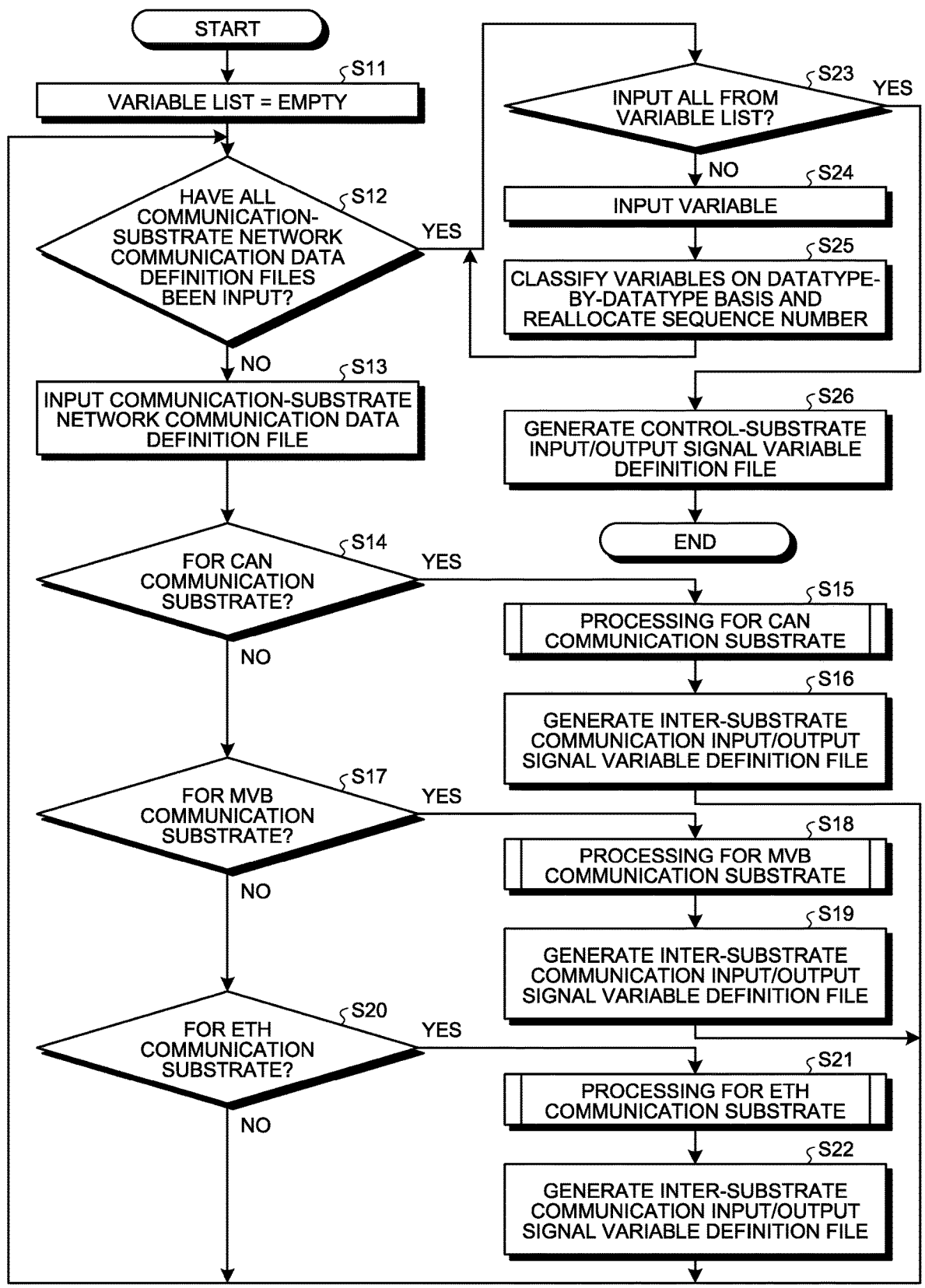
FIG. 13 is a flowchart illustrating processing for generating a control-substrate input/output signal variable definition file in the program development supporting apparatus.

FIG. 13 is a flowchart illustrating processing for generating the control-substrate input/output signal variable definition file in the program development supporting apparatus 70 according to the present embodiment. The flowchart of FIG. 13 illustrates details of the processing in the program development supporting apparatus 70 in step S2 of the flowchart illustrated in FIG. 7. First, when the input unit 71 of the program development supporting apparatus 70 receives each communication-substrate network communication data definition file, the generation unit 73 of the program development supporting apparatus 70 initializes a variable list for creating the control-substrate input/output signal variable definition file, that is, the generation unit 73 makes the variable list empty (step S11). When not all, or none of, the communication-substrate network communication data definition files is received by the generation unit 73 from the input unit 71, that is, when not all, or none of, the communication-substrate network communication data definition files is input from the input unit 71 to the generation unit 73 (step S12: No), any one of the communication-substrate network communication data definition files is input (step S13).

Figure 14:
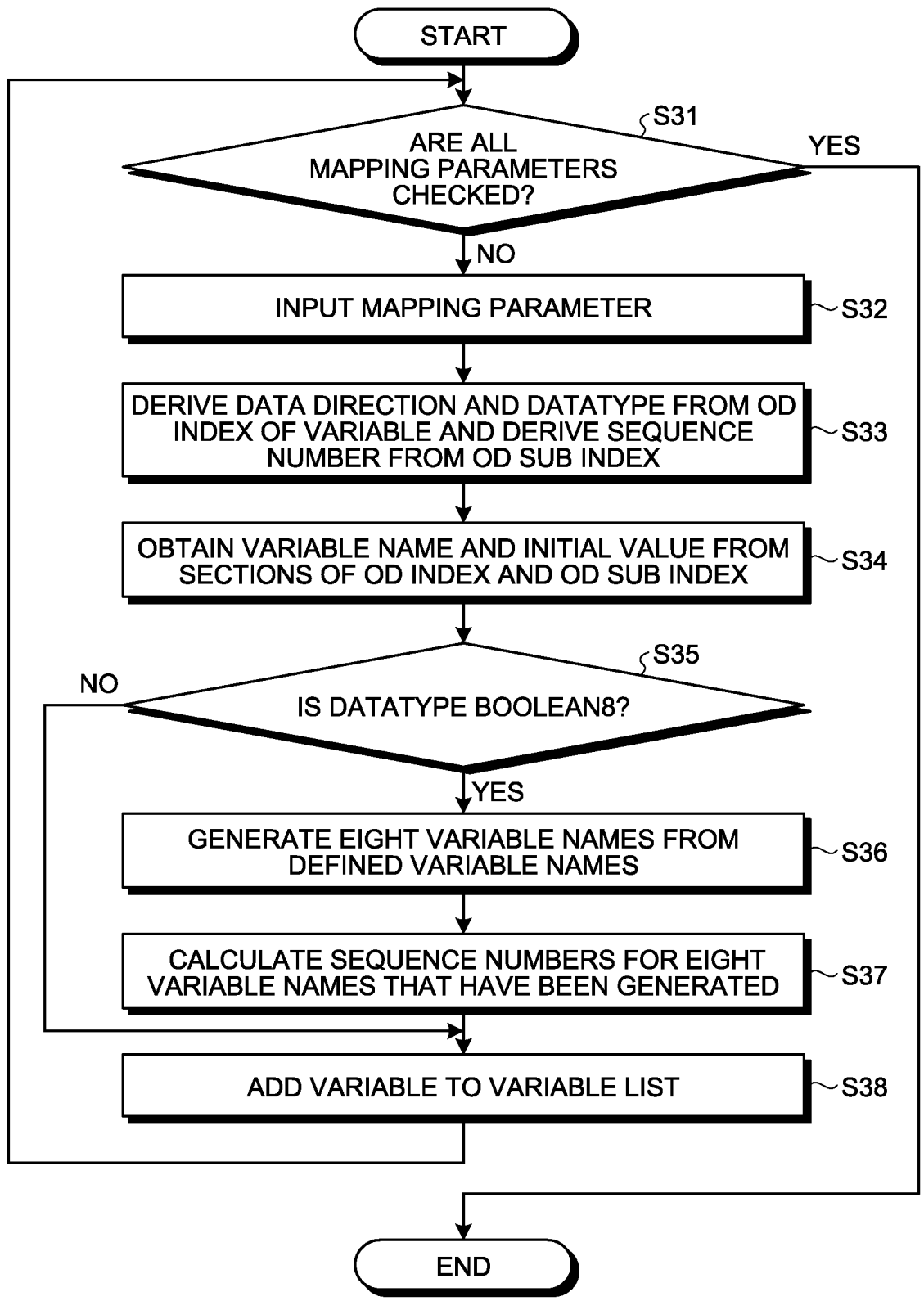
FIG. 14 is a flowchart illustrating the processing for the CAN communication substrate, the processing being performed by a generation unit of the program development supporting apparatus.

When the input communication-substrate network communication data definition file is that for the CAN communication substrate (step S14: Yes), the generation unit 73 performs processing for the CAN communication substrate (step S15) and generates an inter-substrate input/output signal variable definition file for a CAN communication substrate (step S16). The processing for the CAN communication substrate will be described below in detail. FIG. 14 is a flowchart illustrating the processing for the CAN communication substrate, the processing being performed by the generation unit 73 of the program development supporting apparatus 70 according to the present embodiment. FIG. 14 illustrates processing for the generation unit 73 to generate a variable list for the CAN communication substrate, from the CAN-communication-substrate network communication data definition file. The inter-substrate input/output signal variable definition file associates the communication data (illustrated in FIG. 4) between each communication substrate 41 and the control substrate 42 with the input/output signal to/from each sub system in the intra-train network connected to the corresponding communication substrate 41. In the inter-substrate input/output signal variable definition file, the variables are classified on a datatype-by-datatype basis, and the sequence numbers are allocated in the inter-substrate communication data in such a manner that none of the allocated sequence numbers is duplicated.

When not all, or none of, mapping parameters in the network communication data definition file for a CAN communication substrate illustrated in FIGS. 8 and 9 is not checked (step S31: No), the generation unit 73 inputs a mapping parameter from the CAN-communication-substrate network communication data definition file (step S32). A target mapping parameter is a Process Data Object (PDO) mapping parameter and an internal variable. FIG. 8 illustrates an example of the PDO mapping parameter in the CAN-communication-substrate network communication data definition file, and FIG. 9 is an example of the internal variable in the CAN-communication-substrate network communication data definition file. The internal variable is a variable used in the VCU 4. Since the internal variable is not an input/output signal to/from the sub system, the internal variable cannot be defined by the PDO mapping parameter. Therefore, the internal variable is defined by an entry specific to a manufacturer of an Object Dictionary (OD). A format of the internal variable is the same as the format of the PDO mapping parameter. In the example in FIG. 9, a section "[2002sub1]" corresponds to the internal variable. For the section "[1A11sub1]" in FIG. 8, the mapping parameter of the CAN-communication-substrate network communication data definition file input in step S32 is "0x52800110".

The generation unit 73 derives a data direction and a datatype from the OD index of the variable and derives a sequence number from an OD sub index (step S33). FIGS. 15 and 16 are diagrams illustrating examples of information regarding relationship between the OD index, the data direction, and the datatype, the information being held by the storage unit 72 of the program development supporting apparatus 70 according to the present embodiment. FIG. 15 illustrates the case where the information includes the data direction "in" indicating that the data is input, and FIG. 16 illustrates the case where the information includes the data direction "out" indicating that the data is output. When the mapping parameter is the section "[1A11sub1]", the OD index of the variable is "0x5280", and the OD sub index is "0x01". The OD sub index of "0x01" is a combination of "0x" and "01" from among the elements "0x", "5280", "01", and "10" that are combined together into "0x52800110". In this case, the generation unit 73 refers to the information in FIGS. 15 and 16 to thereby derive the data direction "Out", the datatype "UNSIGNED16", and the sequence number "0x01−1=0". The reason for decrement by "−1" in calculation of sequence numbers is to start the sequence number from "zero".

The generation unit 73 obtains a variable name and an initial value from the section of the OD index and the OD sub index (step S34). When the OD index is "0x5280", the generation unit 73 obtains the variable name "RIO_AOch0" and the initial value "0x800" from the section "0x5280sub1".

The generation unit 73 confirms whether the derived datatype is "BOOLEAN8" (step S35). For example, when the mapping parameter is that in the section "[1610sub1]", the generation unit 73 derives the data direction "in" and the datatype "BOOLEAN8". Furthermore, since the section "[1610sub1]" provides the OD index "0x5000" and the OD sub index "0x01", the generation unit 73 derives the variable name "CAN_RIO_DIch[7 . . . 0]". When the derived datatype is "BOOLEAN8" (step S35: Yes), the generation unit 73 generates eight variable names from defined variable names (step S36).

When the variable name includes "[ . . . ]", the generation unit 73 generates variable names having numerals in "[ . . . ]" added thereto in accordance with generation rule 1. Specifically, when the variable name is "CAN_RIO_DIch [7 . . . 0]", the generation unit 73 generates eight variable names, "CAN_RIO_DIch7" to "CAN_RIO_DIch0". In addition, when the variable name includes "[,]", the generation unit 73 divides the variable name with [,] in accordance with generation rule 2. Specifically, when the variable name is "Diginput3, Diginput2, Diginput1, Diginput0", the generation unit 73 generates four variable names, "Diginput0" to "Diginput3". Furthermore, when the variable name is not defined yet, the generation unit 73 generates a default character string in accordance with generation rule 3. For example, the default character string is "communication substrate physical standard+communication substrate number+"_"+"var"+index in hexadecimal notation+h+"_"+sub index in hexadecimal notation+h+"bit"+bit numbers from zero to seven". Specifically, the user generates "CAN1_var5000h_0Ah_bit7" to "CAN1_var5000h_0Ah_bit0". In addition, when the variable name is defined, but eight variable names cannot be generated in accordance with generation rules 1 and 2, generation rule 4 applies to allow the generation unit 73 complement the variable name in accordance with generation rule 3. Note that these generation rules are merely examples and are not limited to these.

The generation unit 73 calculates sequence numbers for the generated eight variable names (step S37). For example, the generation unit 73 calculates the sequence number as (OD sub index0x01−1)×8+bit numbers (0 to 7).

On the other hand, when the derived datatype is not "BOOLEAN8" (step S35: No), the generation unit 73 omits processing in steps S36 and S37.

The generation unit 73 adds to a variable list a variable having a variable name etc. obtained from the input mapping parameter (step S38).

In a case where the generation unit 73 repeatedly performs the processing until all the mapping parameters of the CAN-communication-substrate network communication data definition file illustrated in FIGS. 8 and 9 are checked. When all the mapping parameters of the CAN-communication-substrate network communication data definition file illustrated in FIGS. 8 and 9 are checked (step S31: Yes), the generation unit 73 ends the processing for the CAN communication substrate.

Referring back to the flowchart in FIG. 13, the generation unit 73 generates the inter-substrate communication input/output signal variable definition file for a CAN communication substrate in accordance with the obtained variable list (step S16). The inter-substrate communication input/output signal variable definition file for a CAN communication substrate includes information on the datatype, on the data direction, and on the variable name, with the sequence number allocated on a datatype-by-datatype basis. FIG. 17 is a diagram illustrating an exemplary configuration of the inter-substrate communication input/output signal variable definition file generated by the generation unit 73 of the program development supporting apparatus 70 according to the present embodiment. The inter-substrate communication input/output signal variable definition file indicates the datatype, the data direction, the sequence number, and the variable name on a variable-by-variable basis, and allocates the sequence number on a datatype-by-datatype basis. A configuration of the inter-substrate communication input/output signal variable definition file is common among the CAN communication substrate, the MVB communication substrate, and the ETH communication substrate.

Figure 18:
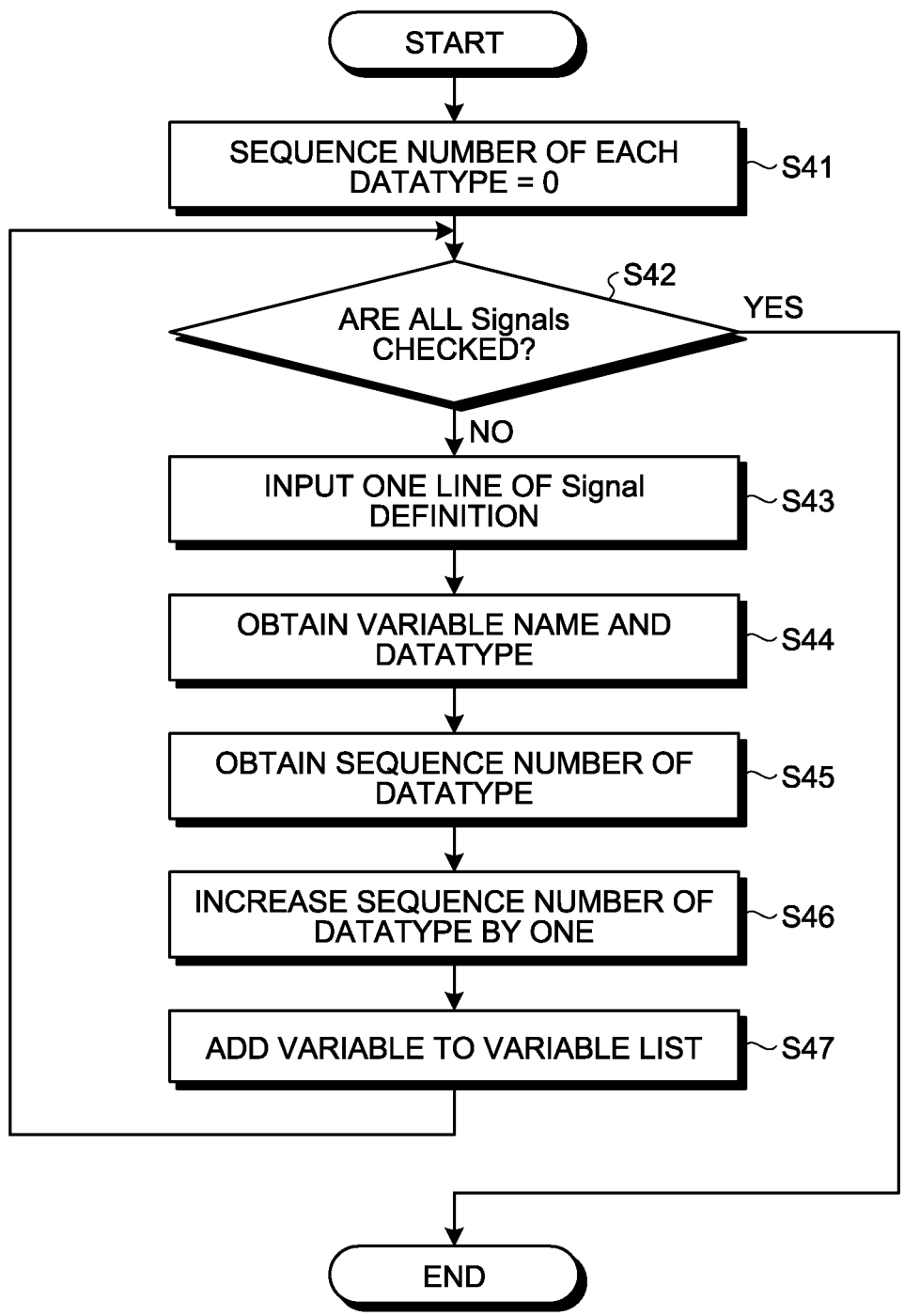
FIG. 18 is a flowchart illustrating processing for the MVB communication substrate, the processing being performed by the generation unit of the program development supporting apparatus.

When the input communication-substrate network communication data definition file is that not for the CAN communication substrate (step S14: No) but for the MVB communication substrate (step S17: Yes), the generation unit 73 performs processing for the MVB communication substrate (step S18), and generates the inter-substrate communication input/output signal variable definition file for the MVB communication substrate (step S19). The processing for the MVB communication substrate will be described below in detail. FIG. 18 is a flowchart illustrating processing for the MVB communication substrate, the processing being performed by the generation unit 73 of the program development supporting apparatus 70 according to the present embodiment. FIG. 18 illustrates the processing for the generation unit 73 to generate a variable list for the MVB communication substrate from the MVB-substrate-communication network communication data definition file.

The generation unit 73 sets a sequence number of each datatype to zero (step S41). When the generation unit 73 does not check all of Signals written in the MVB-communication-substrate network communication data definition file illustrated in FIG. 10 (step S42: No), the generation unit 73 inputs one line of Signal definition from the MVB-communication-substrate network communication data definition file (step S43).

The generation unit 73 obtains a variable name and a datatype from the input Signal definition (step S44). Specifically, the generation unit 73 obtains a variable name from "Name" in the Signal definition illustrated in FIG. 10 and obtains a datatype from "Type". The generation unit 73 obtains a sequence number of the datatype (step S45). The generation unit 73 obtains the currently set sequence number and allocates the obtained sequence number for the obtained datatype. Regarding a first Signal definition of each datatype, the sequence number is set to zero because the generation unit 73 sets the sequence number to zero in step S41. The generation unit 73 increases the sequence number of the datatype by one, the sequence number having been obtained in step S45 (step S46). The generation unit 73 adds to the variable list the variable having the variable name etc. obtained from the input Signal definition (step S47).

The generation unit 73 repeatedly performs the processing until all the Signals in the network communication data definition file for an MVB communication substrate illustrated in FIG. 10 are checked. When all the Signals in the MVB-communication-substrate network communication data definition file illustrated in FIG. 10 are checked (step S42: Yes), the generation unit 73 ends the processing for the MVB communication substrate.

Referring back to the flowchart in FIG. 13, the generation unit 73 generates the inter-substrate communication input/output signal variable definition file for an MVB communication substrate in accordance with the obtained variable list (step S19). The inter-substrate communication input/output signal variable definition file for an MVB communication substrate includes information on the datatype, on the data direction, on the sequence number and on the variable name, with the sequence number allocated on a datatype-by-datatype basis. A configuration of the inter-substrate communication input/output signal variable definition file for an MVB communication substrate is similar to the configuration in FIG. 17.

Figure 19:
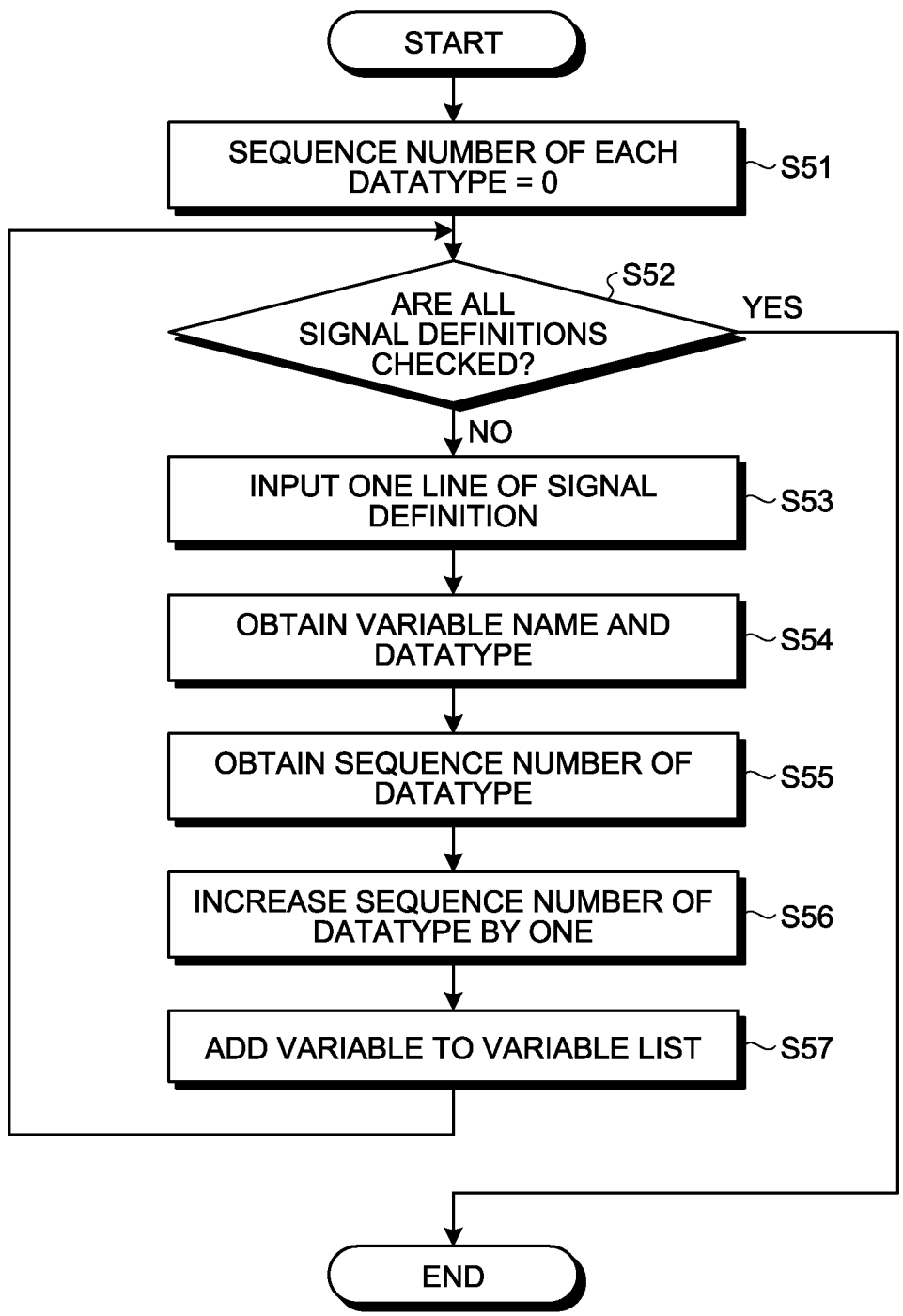
FIG. 19 is a flowchart illustrating processing for the ETH communication substrate, the processing being performed by the generation unit of the program development supporting apparatus.

When the input communication-substrate network communication data definition file is that for not the CAN communication substrate (step S14: No), and the MVB communication substrate (step S17: No), but the ETH communication substrate (step S20: Yes), the generation unit 73 performs the processing for the ETH communication substrate (step S21) and generates an inter-substrate communication input/output signal variable definition file for the ETH communication substrate (step S22). The processing for the ETH communication substrate will be described below in detail. FIG. 19 is a flowchart illustrating processing for the ETH communication substrate, the processing being performed by the generation unit 73 of the program development supporting apparatus 70 according to the present embodiment. FIG. 19 illustrates the processing for the generation unit 73 to generate a variable list for the ETH communication substrate from the ETH-communication-substrate network communication data definition file.

The generation unit 73 sets a sequence number of each datatype to zero (step S51). In a case where the generation unit 73 does not check all of signal definitions written in the ETH-communication-substrate network communication data definition file illustrated in FIG. 11 (step S52: No), the generation unit 73 inputs one line of the signal definition from the ETH-communication-substrate network communication data definition file (step S53).

The generation unit 73 obtains a variable name and a datatype from the input signal definition (step S54). Specifically, the generation unit 73 obtains a variable name from "variable name" in the signal definition illustrated in FIG. 11 and obtains a datatype from "datatype". The generation unit 73 obtains a sequence number of the datatype (step S55). The generation unit 73 obtains the currently set sequence number and allocates the obtained sequence number for the obtained datatype. Regarding a first signal definition of each datatype, the sequence number is set to zero because the generation unit 73 sets the sequence number to zero in step S51. The generation unit 73 increases the sequence number of the datatype by one, the sequence number having been obtained in step S55 (step S56). The generation unit 73 adds to the variable list the variable having the variable name etc. obtained from the input signal definition (step S57).

The generation unit 73 repeatedly performs the processing until all the signal definitions in the ETH-communication-substrate network communication data definition file illustrated in FIG. 11 are checked. When all the signal definitions in the ETH-communication-substrate network communication data definition file in FIG. 11 (step S52: Yes) are checked, the generation unit 73 ends the processing for the ETH communication substrate.

Referring back to the flowchart in FIG. 13, the generation unit 73 generates the inter-substrate communication input/output signal variable definition file for the ETH communication substrate in accordance with the obtained variable list (step S22). The inter-substrate communication input/output signal variable definition file for an ETH communication substrate includes information on the datatype, on the data direction, on the sequence number, and on the variable name, with the sequence number allocated on a datatype-by-datatype basis. A configuration of the inter-substrate communication input/output signal variable definition file for an ETH communication substrate is similar to the configuration in FIG. 17.

When the communication-substrate input network communication data definition file is not that for any of the CAN communication substrate (step S14: No), the MVB communication substrate (step S17: No), and the ETH communication substrate (step S20: No), the generation unit 73 returns to the processing in step S12. After the processing in steps S16, S19, and S22, the generation unit 73 returns to the processing in step S12.

When the generation unit 73 has received all the communication-substrate network communication data definition files, that is, has input the files from the input unit 71 (step S12: Yes), the generation unit 73 inputs variables from the variable lists included in all the inter-substrate communication input/output signal variable definition files obtained by the processing for the CAN communication substrate, the processing for the MVB communication substrate, and the processing for the ETH communication substrate. When all the variables are not input from the variable list (step S23: No), the variables are input (step S24), and the variables are classified on a datatype-by-datatype basis, and the sequence numbers are reallocated thereto (step S25). The generation unit 73 repeatedly performs the above processing until all the variables are input from the variable list. When all the variables have been input from the variable list (step S23:

Yes), the generation unit 73 generates the control-substrate input/output signal variable definition file by using the variables having the reallocated sequence number (step S26). The output unit 74 outputs the control-substrate input/output signal variable definition file generated by the generation unit 73. A configuration of the control-substrate input/output signal variable definition file is similar to the configuration of the inter-substrate communication input/output signal variable definition file illustrated in FIG. 17.

In the variable list included in each inter-substrate communication input/output signal variable definition file, all the variables used in the sub system of the network corresponding to each communication substrate are registered. The generation unit 73 extracts the variables from the variable one by one and classifies the variables on a datatype-by-datatype basis, reallocates the sequence number from zero, and generates the control-substrate input/output signal variable definition file. Each inter-substrate communication input/output signal variable definition file is associated with the control-substrate input/output signal variable definition file by the variable name, so that such definitions uniquely associate each input/output signal to/from the intra-train network with the variable in the PLC software performed by the operation processing unit 62 of the control substrate 42.

Next, a hardware configuration of the program development supporting apparatus 70 will be described. The input unit 71 and the output unit 74 of the program development supporting apparatus 70 are implemented by an interface circuit to/from which data are input/output. Furthermore, the data storage unit 72 is implemented by a memory. The generation unit 73 is implemented by a processing circuit. The processing circuit may be a Central Processing Unit (CPU) for executing a program stored in the memory, a memory, or a dedicated hardware.

Figure 20:
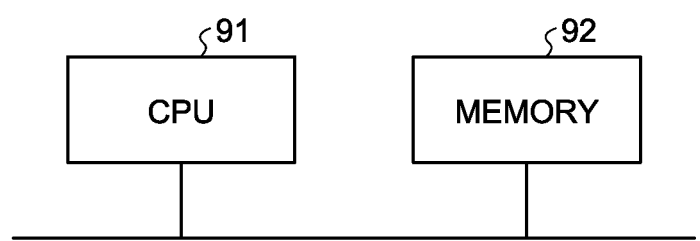
FIG. 20 is a diagram illustrating an example in which a processing circuit of the program development supporting apparatus is configured by a CPU and a memory.

FIG. 20 is a diagram illustrating an example in which the processing circuit of the program development supporting apparatus 70 according to the present embodiment is configured by a CPU and a memory. Where the processing circuit is configured by a CPU 91 and a memory 92, each function of the generation unit 73 is implemented by software, firmware, or a combination of software and firmware. The software and the firmware are written as a program and stored in the memory 92. In the processing circuit, the CPU 91 reads and executes the program stored in the memory 92, thereby implementing each function. That is, the program development supporting apparatus 70 includes the memory 92 for storing the program that, when the processing circuit is implemented by the generation unit 73, executes a step of generating each communication-substrate input/output signal variable definition file and a step of generating a control-device input/output signal variable definition file from each communication-substrate input/output signal variable definition file. Furthermore, these programs may be construed as causing a computer to execute a procedure and a method of the program development supporting apparatus 70. The CPU 91 may be a processing device, an operation device, a microprocessor, a microcomputer, a processor, or a Digital Signal Processor (DSP). Furthermore, the memory 92 is, for example, a non-volatile or volatile semiconductor memory such as a Random Access Memory (RAM), a Read Only Memory (ROM), a flash memory, an Erasable Programmable ROM (EPROM), and an Electrically EPROM (EEPROM), a magnetic disk, a flexible disk, an optical disk, a compact disk, a mini disk, or a Digital Versatile Disc (DVD). The memory 92 may be the same as the memory implementing the storage unit 72.

Figure 21:
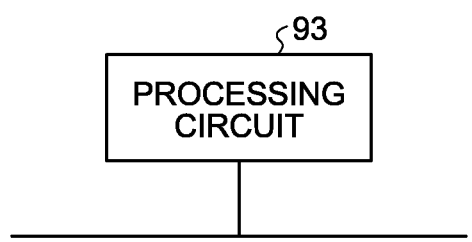
FIG. 21 is a diagram illustrating an example in which the processing circuit of the program development supporting apparatus is configured by dedicated hardware.

FIG. 21 is a diagram illustrating an example in which the processing circuit of the program development supporting apparatus 70 according to the present embodiment is implemented by a dedicated hardware. Where the processing circuit is a dedicated hardware, a processing circuit 93 illustrated in FIG. 21 is, for example, a single circuit, a composite circuit, a programmed processor, a parallel-programmed processor, an Application Specific Integrated Circuit (ASIC), a Field-Programmable Gate Array (FPGA), or a combination thereof. Each function of the generation unit 73 may be implemented by the processing circuit 93 or alternatively the functions of the generation unit 73 may be collectively implemented by the processing circuit 93.

Each function of the generation unit 73 may be partially implemented by a dedicated hardware and may be partially implemented by software or firmware. In this way, the processing circuit can realize each function by a dedicated hardware, software, firmware, or a combination thereof.

As described above, according to the present embodiment, regarding the variables included in the communication-substrate network communication data definition file, by using the communication-substrate network communication data definition file used in each of the plurality of communication substrates created by the user, the program development supporting apparatus 70 generates each inter-substrate communication input/output signal variable definition file for the corresponding communication-substrate network communication data definition file, the inter-substrate communication input/output signal variable definition file including the information on the datatype, on the data direction, on the sequence number, and on the variable name with the sequence number allocated on a datatype-by-datatype basis, and generates the control-substrate input/output signal variable definition file having the reallocated sequence numbers, by using all the inter-substrate communication input/output signal variable definition files. Using all the input/output signals as variables in the same model space in the VCU 4 enables the user to execute programming taking into account only the input/output signal without considering which intra-train network is connected to the sub system. Accordingly, logic in the programming of software used in the VCU 4 in the TCMS 5 is easily created, and it is possible to reduce the number of man-hours required for development of the program. Furthermore, since an operation environment is written as a definition file, hard coding is not needed in the VCU 4, and the number of development processes can be reduced.

In addition, conventionally, the TCMS has been constructed by programming. By using the program development supporting apparatus 70, the TCMS 5 can be constructed only by setting, without programming.

The structures indicated in the above embodiment indicate exemplary contents of the present invention and can be combined with another known technique. Furthermore, the structures indicated in the embodiment can be partially omitted and changed without departing from the scope of the present invention.

REFERENCE SIGNS LIST 1, 2, 3 intra-train network; 1-1 to 1-5, 2-1 to 2-5, 3-1 to 3-4 sub system; 4 VCU; 5 TCMS; 41-1, 41-2, 41-3 communication substrate; 42 control substrate; 43 inter-substrate communication bus; 51-1-1, . . . , 51-1-*m*, 51-3-1, . . . , 51-3-*m* communication data signal inputting unit; 52-1, . . . , 52-3, 53-1, . . . , 53-3, 61-1, . . . , 61-3, 63-1, . . . , 63-3 inter-substrate communication unit; 54-1-1, . . . , 54-1-*m*, 54-3-1, . . . , 54-3-*m* communication data signal outputting unit; 62 operation processing unit; 70 program development supporting apparatus; 71 input unit; 72 storage unit; 73 generation unit; 74 output unit; 80 communication cable.

The invention claimed is:

1. A program development supporting apparatus for supporting development of a program used in a controller of a train monitoring and controlling apparatus including a plurality of intra-train networks and the controller, the controller transmitting/receiving signals to/from the plurality of intra-train networks, the controller including a plurality of communication substrates for communicating with one of the plurality of intra-train networks and a control substrate connected to the plurality of communication substrates, the program development supporting apparatus comprising:
   a receiver to receive a communication-substrate network communication data definition file used in each of the plurality of communication substrates;
   a generator to generate a control-substrate input/output signal variable definition file by using the communication-substrate network communication data definition file, the control-substrate input/output signal variable definition file being used in the control substrate, the control substrate performing communication in a common communication data format that is a communication format in common among the plurality of communication substrates; and
   a transmitter to output the control-substrate input/output signal variable definition file.

2. The program development supporting apparatus according to claim 1, wherein
   the generator
   generates an inter-substrate communication input/output signal variable definition file for each communication substrate by communication-substrate network communication data definition file, the inter-substrate communication input/output signal variable definition file including information on a datatype, on a data direction, on a sequence number, and on a variable name with the sequence number allocated on a datatype-by-datatype basis, and
   generates the control-substrate input/output signal variable definition file by using all the inter-substrate communication input/output signal variable definition files, and reallocating the sequence number on the datatype-by-datatype basis.

3. A train monitoring and controlling apparatus comprising:
   a plurality of intra-train networks; and
   a controller to transmit/receive signals to/from the plurality of intra-train networks, wherein
   the controller includes a plurality of communication substrates for communicating with one of the plurality of intra-train networks and a control substrate connected to the plurality of communication substrates,
   the control substrate includes a first inter-substrate communicator to convert signals to be transmitted to the plurality of communication substrates, into signals in a common communication data format that is a communication data format in common among the plurality of communication substrates on a basis of software and a control-substrate input/output signal variable definition file, transmit the converted signals, and receive signals in the common communication data format from the plurality of communication substrates, in communication with the plurality of communication substrates and
   the plurality of communication substrates includes a second inter-substrate communicator to convert signals to be transmitted to the control substrate, into signals in the common communication data format on the basis of a communication-substrate network communication data definition file, transmit the converted signals, and receive signals in the common communication data format from the control substrate, in communication with the control substrate,
   wherein the software is written in the control substrate,
   wherein the control-substrate input/output signal variable definition file defines a list of variables of named input/output signals of the control device and defines association with inter-substrate communication data between the control substrate and the plurality of communication substrates, and
   wherein the communication-substrate network communication data definition file defines communication data with a sub system connected to a corresponding one of the intra-train networks.

4. A program development supporting method of a program development supporting apparatus for supporting development of a program used in a controller of a train monitoring and controlling apparatus including a plurality of intra-train networks and the controller, the controller transmitting/receiving signals to/from the plurality of intra-train networks, the controller including a plurality of communication substrates for communicating with one of the plurality of intra-train networks and a control substrate connected to the plurality of communication substrates, the program development supporting method comprising:
   receiving a communication-substrate network communication data definition file used in each of the plurality of communication substrates;
   generating a control-substrate input/output signal variable definition file by using the communication-substrate network communication data definition file, the control-substrate input/output signal variable definition file being used in the control substrate, the control substrate performing communication in a common communication data format that is a communication format in common among the plurality of communication substrates; and
   outputting the control-substrate input/output signal variable definition file.

5. The program development supporting method according to claim 4, wherein
   generating the control-substrate input/output signal variable definition file includes:
   generating an inter-substrate communication input/output signal variable definition file for each communication substrate by communication-substrate network communication data definition file, inter-substrate communication input/output signal variable definition file including information on a datatype, on a data direction, on a sequence number, and on a variable name with the sequence number allocated on a datatype-by-datatype basis; and
   generating the control-substrate input/output signal variable definition file by using all the inter-substrate communication input/output signal variable definition files and reallocating the sequence number on the datatype-by-datatype basis.

\* \* \* \* \*